United States Patent Office 2,824,135
Patented Feb. 18, 1958

---

2,824,135

PURIFICATION OF DICARBOXYLIC ACIDS

Geraldine B. Corcoran, Chicago, Ill., assignor to The C. P. Hall Co. of Illinois, Chicago, Ill., a corporation of Ohio No Drawing. Application May 24, 1955
Serial No. 510,867

3 Claims. (Cl. 260—537)

This invention relates to the purification of suberic acid contained in a crystalline mixture of carboxylic acids containing essentially suberic acid and azelaic acid.

Most commercial mixtures of suberic and azelaic acids contain a relatively small amount (e. g. 1 to 5 percent) of sebacic acid. This is illustrated in Table 1, below.

These three higher molecular-weight dicarboxylic acids are designated herein as follows:

Suberic acid will be called $C_8$;
Azelaic acid will be called $C_9$; and
Sebacic acid will be called $C_{10}$;

the numbers indicating the number of carbons in the respective acids.

Such mixtures of acids are obtained by the oxidation of saturated and unsaturated fatty acids from various sources, and particularly the dicarboxylic acid mixtures derived from tall oil fatty acids after removal of the rosin acids therefrom. They are also obtainable from saturated and unsaturated acyclic aliphatic hydrocarbons and oxygen derivatives thereof. They may be obtained by oxidation of the foregoing by nitric acid, $NO_2$, $N_2O_4$ or other oxides of nitrogen above $N_2O$. Dicarboxylic acid mixtures obtained by such oxidations and containing relatively high percentages of the lower dicarboxylic acids must first have the lower acids, such as the acids containing 4 to 7 carbon atoms, separated and removed therefrom to obtain mixtures containing only small amounts of such acids before using the treatment covered herein. Thus, such mixtures contain over 60 percent and as much as 90 to substantially 100 percent of the $C_8$, $C_9$ and $C_{10}$ acids.

When crude dicarboxylic acids are produced from such sources they may have a composition as follows, depending upon the source of the starting materials. Table 1 shows the composition of dicarboxylic acids produced from acidulated cottonseed foots fatty acids (C. S. Foots F. A.) and from tall oil fatty acids (Tall Oil F. A.) low in rosin acids.

TABLE 1

| Carbon No. | Acid | From C. S. Foots F. A. | From Tall Oil F. A. |
|---|---|---|---|
| | | Percent | Percent |
| $C_4$ | Succinic | 11.65 | 6.26 |
| $C_5$ | Glutaric | 12.50 | 7.20 |
| $C_6$ | Adipic | 14.55 | 10.43 |
| $C_7$ | Pimelic | 16.00 | 5.11 |
| $C_8$ | Suberic | 25.87 | 35.66 |
| $C_9$ | Azelaic | 16.83 | 31.07 |
| $C_{10}$ | Sebacic | 2.50 | 4.28 |
| | | 99.90 | 100.01 |

The shorter chain acids may be separated from the $C_8$, $C_9$ and $C_{10}$ by dissolving such mixtures in a solvent such as orthodichlorobenzene, as more particularly described nad claimed in Pooler application Serial No. 169,542, filed June 21, 1950, now U. S. 2,716,133. Such recrystallized $C_8$, $C_9$ and $C_{10}$ acids contain small amounts of the shorter chain dicarboxylic acids and particularly succinic and adipic acids, together with a small amount of monocarboxylic acids.

Study of the solubility of $C_8$, $C_9$ and $C_{10}$ in nitric acid of 25, 40 and 58 percent concentrations by weight at 25, 50, 80 and 90° C. actually gave the following results for the solubility of dicarboxylic acids. (In the table, all solubilities are recorded as grams of dicarboxylic acid per liter.)

TABLE 2

| | Solubilities | | |
|---|---|---|---|
| | 25% $HNO_3$ | 40% $HNO_3$ | 58% $HNO_3$ |
| Suberic Acid: Temperature— | | | |
| 25° C | 0.35 | 0.02 | 0.06 |
| 50° C | 1.96 | 3.94 | 24.59 |
| 80° C | 52.86 | 221.77 | 398.50 |
| 90° C | 230.44 | 651.46 | 851.22 |
| Azelaic Acid: Temperature— | | | |
| 25° C | 0.07 | 0.26 | 39.38 |
| 50° C | 12.02 | 21.54 | 138.16 |
| 80° C | 565.47 | 1,463.69 | 1,998.89 |
| 90° C | 1,419.01 | 2,378.76 | 2,636.27 |
| Sebacic Acid: Temperature— | | | |
| 25° C | | 0.73 | 0.18 |
| 50° C | 0.20 | 0.87 | 1.50 |
| 80° C | 11.28 | 45.01 | 486.23 |
| 90° C | 74.15 | 229.33 | 770.11 |

It can thus be seen that both the concentration of nitric acid employed and the temperature at which the determination is made has a marked effect upon the solubility in nitric acid.

The increase in the purity of the suberic acid is marked when the crystalline starting material contains a large amount of azelaic acid since the nitric acid dissolves the azelaic acid in preference to the suberic and sebacic acids, as shown by the solubilities in Table 2. Little improvement is noted when there is no more than a small amount of azelaic acid in the mixture.

The following examples illustrate the invention by referring to crystallizations with 17.5 percent and 58 percent nitric acid.

Example 1 (17.5% $HNO_3$)

In this example, 50.5 grams of mixed acids were used. The starting material contained 2.37 percent of monocarboxylic acid. On the basis of the dicarboxylic acids present, this sample had the following analysis:

| Acid: | Percent (by weight) |
|---|---|
| Succinic | 0.02 |
| Glutaric | 0.02 |
| Adipic | 0.73 |
| Pimelic | [1] 1.15 |
| Suberic | 67.50 |
| Azelaic | 25.90 |
| Sebacic | 2.31 |
| Monocarboxylic | 2.37 |
| Total | 100. |

[1] By difference.

Fifty and one-half grams of this mixture were dissolved in 200 ml. of 17.5 percent $HNO_3$ by heating to 95° C. Then as it was cooled, various fractions of crystals were collected at the temperatures recorded in the second column of Table 3.

of each was recorded, together with the analysis of the remaining filtrate, and the analysis of the wash water. (The analyses of Tables 3 and 4 were made chromatographically. The weights are given in grams.) The last figure in the fourth column refers to the 50.5 grams of starting material.

The fifth column shows, that the second and third fractions (obtained by cooling to 60 and then 54° C.) total 57.60 percent of the starting material. The last column shows there is 1.12 percent of the lower molecular weight acids present. The other figures in the following analysis of the total of these two fractions, are readily located in Table 3:

| Acid: | Percent |
|---|---|
| Succinic | ⎫ |
| Glutaric | ⎪ |
| Adipic | ⎬ 1.12 |
| Pimelic | ⎭ |
| Suberic | 81.55 |
| Azelaic | 11.60 |
| Sebacic | 2.66 |
| Monocarboxylic | 3.07 |
| Total | 100. |

Thus, by one solution in nitric acid, and combining two cuts taken at 60° and 54° C., 57.6 percent of the starting material was recovered and in it the suberic acid content was raised from 67.50 percent (in the starting material, above) to 81.55 percent.

Example 1a

The second and third cuts (Example 1), totaling 57.6

TABLE 3

| Cut No. | Temp., °C. | Each Fraction | | | Monocarboxylic Acid | | | | Sebacic Acid | | | |
|---|---|---|---|---|---|---|---|---|---|---|---|---|
| | | Weight | | Percent Cumul. | This Fraction | | Cumulative | | This Fraction | | Cumulative | |
| | | This | Cumul. | | Percent | Wt. | Wt. | Percent | Percent | Wt. | Wt. | Percent |
| 1 | 70 | (Note No. 1) | 5.45 | | 20.25 | | | | 2.05 | | | |
| 2 | 60 | 5.45 | 5.45 | 10.79 | 4.57 | 0.2491 | 0.2491 | 4.57 | 2.76 | 0.1504 | 0.1504 | 2.76 |
| 3 | 54 | 23.65 | 29.10 | 57.60 | 2.73 | 0.6456 | 0.8947 | 3.07 | 2.64 | 0.6244 | 0.7748 | 2.66 |
| 4 | 44 | 7.2 | 36.30 | 71.80 | 2.22 | 0.1598 | 1.0545 | 2.91 | 2.52 | 0.1814 | 0.9562 | 2.64 |
| 5 | 35 | 7.6 | 43.90 | 86.90 | 0.98 | 0.0745 | 1.1290 | 2.57 | 2.14 | 0.1626 | 1.1188 | 2.64 |
| 6 | 20 | 0.4 | 44.30 | 87.80 | 1.87 | 0.0075 | 1.1365 | 2.56 | 1.83 | 0.0073 | 1.1261 | 2.54 |
| 7 | 7 | 1.0 | 45.30 | 89.80 | 0.38 | 0.0038 | 1.1403 | 2.52 | 0.80 | 0.0080 | 1.1341 | 2.50 |
| Filtrate | Room | 1.8 | 47.10 | 93.50 | 0.98 | 0.0176 | 1.1579 | 2.46 | 0.08 | 0.0014 | 1.1355 | 2.41 |
| Wash water | Room | 3.4 | 50.50 | 100.00 | 1.22 | 0.0415 | 1.1994 | 2.37 | 1.00 | 0.0340 | 1.1695 | 2.31 |
| | | 50.50 | | | | | 1.1994 | | | | 1.1695 | |

| Cut No. | Azelaic Acid | | | | Suberic Acid | | | | Percent Other Cryst. Acids | |
|---|---|---|---|---|---|---|---|---|---|---|
| | This Fraction | | Cumulative | | This Fraction | | Cumulative | | This Fraction | Cumulative |
| | Percent | Wt. | Wt. | Percent | Percent | Wt. | Wt. | Percent | | |
| 1 | 10.00 | | | | 57.18 | | | | 10.52 | 10.52 |
| 2 | 9.11 | 0.4965 | 0.4965 | 9.11 | 82.63 | 4.5033 | 4.5033 | 82.63 | 5.5 | 5.5 |
| 3 | 11.81 | 2.7931 | 3.2896 | 11.60 | 81.50 | 19.2748 | 23.7781 | 81.55 | 4.05 | 1.12 |
| 4 | 56.81 | 4.0903 | 7.3799 | 20.15 | 37.38 | 2.6914 | 26.4695 | 73.00 | 1.07 | 1.30 |
| 5 | 42.86 | 3.2574 | 10.6373 | 24.15 | 52.35 | 3.9786 | 30.4481 | 69.50 | 1.67 | 1.14 |
| 6 | 37.34 | 0.1494 | 10.7867 | 24.30 | 56.87 | 0.2275 | 30.6756 | 69.30 | 2.09 | 1.30 |
| 7 | 35.41 | 0.3541 | 11.1408 | 24.60 | 58.88 | 0.5888 | 31.2644 | 69.30 | 4.53 | 1.08 |
| Filtrate | 30.62 | 0.5512 | 11.6920 | 24.75 | 56.22 | 1.0120 | 32.2764 | 69.00 | 12.10 | 1.38 |
| Wash water | 41.16 | 1.3994 | 13.0914 | 25.90 | 54.38 | 1.8489 | 34.1253 | 67.50 | 2.24 | 1.92 |
| | | 13.0914 | | | | 34.1253 | | | | |

Note No. 1: First crystals weighing a few milligrams were removed for chromatographic analysis.

The crystals began to form just under 80° C. and came out over a wide range of temperatures as shown in that table. Seven fractions were collected, and the analysis percent of the starting material, were subjected to further fractional crystallization using further 17.5 percent $HNO_3$. The results are given in Table 4.

TABLE 4

| Cut No. | Temp., °C. | Each Fraction | | | Monocarboxylic Acid | | | | Sebacic Acid | | | |
|---|---|---|---|---|---|---|---|---|---|---|---|---|
| | | Weight | | Percent Cumul. | This Fraction | | Cumulative | | This Fraction | | Cumulative | |
| | | This | Cumul. | | Percent | Wt. | Wt. | Percent | Percent | Wt. | Wt. | Percent |
| 1 | 70 | 0.2 | 0.2 | 0.88 | 8.69 | 0.0174 | 0.0174 | 8.69 | 2.67 | 0.0053 | 0.0053 | 2.67 |
| 2 | 64 | 10.4 | 10.6 | 45.35 | 4.70 | 0.4888 | 0.5062 | 4.77 | 2.86 | 0.2974 | 0.3027 | 2.94 |
| 3 | 55 | 6.1 | 16.7 | 71.36 | 1.96 | 0.1196 | 0.6258 | 3.74 | 3.04 | 0.1854 | 0.4881 | 2.92 |
| 4 | 44 | 1.2 | 17.9 | 76.49 | 1.91 | 0.0229 | 0.6487 | 3.62 | 3.26 | 0.0391 | 0.5272 | 2.94 |
| 5 | 37 | 0.7 | 18.6 | 79.49 | 1.34 | 0.0094 | 0.6581 | 3.54 | 2.64 | 0.0185 | 0.5457 | 2.94 |
| 6 | 21 | 1.5 | 20.1 | 85.89 | 0.36 | 0.0054 | 0.6635 | 3.30 | 0.91 | 0.0137 | 0.5594 | 2.78 |
| 7 | 8 | 0.1 | 20.2 | 86.32 | 0.62 | 0.0006 | 0.6641 | 3.28 | 0.41 | 0.0004 | 0.5598 | 2.77 |
| Filtrate | Room | 2.3 | 22.5 | 96.16 | 0.70 | 0.0161 | 0.6802 | 3.01 | 0.92 | 0.0212 | 0.5810 | 2.58 |
| Wash water | Room | 0.9 | 23.4 | 100.00 | 0.58 | 0.0052 | 0.6854 | 2.93 | 0.29 | 0.0026 | 0.5836 | 2.49 |
| | | 23.4 | | | | | 0.6854 | | | | 0.5836 | |

| Cut No. | Azelaic Acid | | | | Suberic Acid | | | | Percent Other Cryst. Acids | |
|---|---|---|---|---|---|---|---|---|---|---|
| | This Fraction | | Cumulative | | This Fraction | | Cumulative | | This Fraction | Cumulative |
| | Percent | Wt. | Wt. | Percent | Percent | Wt. | Wt. | Percent | | |
| 1 | 4.10 | 0.0082 | 0.0082 | 4.10 | 81.73 | 0.1635 | 0.1635 | 81.73 | 2.81 | 2.81 |
| 2 | 1.65 | 0.1716 | 0.1798 | 1.70 | 88.69 | 9.2238 | 9.3873 | 88.5 | 2.10 | 2.09 |
| 3 | 4.57 | 0.2788 | 0.4586 | 2.74 | 87.67 | 5.3479 | 14.7352 | 88.3 | 2.76 | 2.30 |
| 4 | 9.20 | 0.1104 | 0.5690 | 3.18 | 81.94 | 0.9833 | 15.7185 | 87.9 | 3.69 | 2.36 |
| 5 | 16.77 | 0.1174 | 0.6864 | 3.69 | 75.54 | 0.5288 | 16.2473 | 87.4 | 4.01 | 2.43 |
| 6 | 45.31 | 0.6797 | 1.3661 | 6.80 | 49.23 | 0.7385 | 16.9858 | 84.5 | 4.19 | 2.62 |
| 7 | 38.45 | 0.0385 | 1.4046 | 7.13 | 60.67 | 0.0607 | 17.0465 | 84.4 | | 2.42 |
| Filtrate | 29.23 | 0.6723 | 2.0769 | 9.25 | 0.67 | 1.4787 | 18.5252 | 82.5 | | 2.66 |
| Wash water | 39.17 | 0.3525 | 2.4294 | 10.4 | 54.29 | 0.4886 | 19.0138 | 81.4 | 5.57 | 2.78 |
| | | 2.4294 | | | | 19.0138 | | | | |

If this crystallization had been made at 44° C., 76.49 percent of the starting material would have been recovered (fifth column of the table), and it would have had a suberic acid content of 87.9 percent.

The over-all conversion is to be figured on a total crystal recovery of 76.49 percent of the original crystal recovery of 57.6 percent, or 44.0 percent based on the original 50.5 grams. This 44 percent of the original crystalline mass had the following analysis:

Acid: Percent
Succinic ⎫
Glutaric ⎬ 2.36
Adipic  ⎪
Pimelic ⎭
Suberic _____ 87.9
Azelaic _____ 3.18
Sebacic _____ 2.94
Monocarboxylic _____ 3.62
    Total _____ 100.

The starting material in Example 1 contained 25.90 percent azelaic acid. By crystallization from 17.5 percent HNO₃ (as shown in Example 1), the azelaic acid content of the crystalline acids was reduced to 11.60 percent. By recrystallization from 17.5 percent HNO₃, the azelaic acid has been reduced to 3.18 percent, as shown above. This has resulted in a corresponding suberic acid content which was raised first to 81.55 percent, and then to 87.9 percent.

*Example 2 (58% HNO₃)*

A plant batch was used which had the following analysis:
Acid: Percent
Succinic _____ 0.96
Glutaric _____ 0.14
Adipic _____ 5.83
Pimelic _____ [1] 2.74
Suberic _____ 63.14
Azelaic _____ 23.37
Sebacic _____ 1.58
Monocarboxylic _____ 2.24
    Total _____ 100.

[1] By difference.

This batch was treated like the batches of the previous examples, but 58 percent nitric acid, and crystallized twice, successively, at 54.5° C., giving the following results:

| Acid | Crystallization No. 1 | Crystallization No. 2 |
|---|---|---|
| Succinic | 0.66 | 0.10 |
| Glutaric | 0.20 | 0.16 |
| Adipic | 3.25 | 1.24 |
| Pimelic | 0.18 | 0.12 |
| Suberic | 82.69 | 92.66 |
| Azelaic | 5.32 | 0.22 |
| Sebacic | 2.97 | 1.22 |
| Monocarboxylic | 2.07 | 1.44 |

Thus two crystallizations, using 58 percent nitric acid increased the suberic acid content from 63.14 percent to 92.66 percent, and the azelaic acid content was reduced from 23.37 to 0.22 percent.

*Example 2a*

A laboratory batch and a plant batch of this 92.66 percent suberic acid were recrystallized out of a solution of 6 parts of water to 1 part of the crystalline acids, and said solution cooled to 28° C. and filtered. The plant suction filter did not remove the mother liquor as effectively as the laboratory filter. The analyses of the two batches are recorded below:

| Acid | Laboratory Batch | Plant Batch |
|---|---|---|
| Succinic | 0.00 | 0.28 |
| Glutaric | 0.00 | 0.40 |
| Adipic | 0.06 | 0.06 |
| Pimelic | | |
| Suberic | 96.31 | 95.07 |
| Azelaic | 0.50 | 0.58 |
| Sebacic | 2.22 | 2.55 |
| Monocarboxylic | 1.08 | 1.82 |

*Example 2b*

A laboratory sample of the foregoing 95.07 suberic acid was taken up in orthodichlorobenzene, using 3 parts of solvent to 1 part of the acid. It was cooled to 92° C. and filtered. There was a yield of 90.4 percent of crystals at this temperature, having the following analysis:

| Acid: | Percent |
|---|---|
| Succinic | 0.00 |
| Glutaric | 0.00 |
| Adipic | 0.00 |
| Pimelic | 0.00 |
| Suberic | 98.54 |
| Azelaic | 0.22 |
| Sebacic | 0.62 |
| Monocarboxylic | 0.36 |

A marked reduction in monocarboxylic acid and sebacic acid was noted as a result of the treatment with non-polar solvent.

A plant batch was similarly prepared from the above 95.07 percent suberic acid using orthodichlorobenzene. The plant equipment did not permit the making of a filtration at 92° C. because of the open-top equipment employed. It was necessary to cool to room temperature. The crystals were taken up in water and hot filtered to remove the orthodichlorobenzene and any solid impurities. The filtered solution was crystallized and the mother liquor removed. The crystalline product had the following analysis:

| Acid: | Percent |
|---|---|
| Succinic | 0.10 |
| Glutaric | 0.10 |
| Adipic | 0.12 |
| Pimelic | [1] 0.59 |
| Suberic | 97.79 |
| Azelaic | 0.08 |
| Sebacic | 1.10 |
| Monocarboxylic | 0.12 |
| Total | 100. |

[1] By difference.

Nitric acid of different concentrations may be used, and different temperatures may be employed. The foregoing examples are merely illustrative. The following claims define the invention.

What I claim is:

1. The process of purifying the suberic acid in a crystalline mass composed essentially of suberic and azelaic acids, which comprises dissolving the mass in nitric acid of at least 15 percent concentration at a temperature of at least 70° C. and then, by cooling, obtaining a concentrated solution and then on further cooling to a temperature not below 35° C. crystallizing the suberic acid there from while retaining a substantial amount of the azelaic acid dissolved in the nitric acid.

2. The process of claim 1 in which the crystalline product is recrystallized from nitric acid.

3. The process of claim 1 in which the concentrated solution is cooled until at least substantially 80 percent of the suberic acid content thereof is crystallized out.

References Cited in the file of this patent

UNITED STATES PATENTS

| 2,203,680 | Ellingboe | June 11, 1940 |
| 2,323,061 | Lehmann et al. | June 29, 1943 |
| 2,716,133 | Pooler | Aug. 23, 1955 |